United States Patent [19]

Kerr et al.

[11] Patent Number: 4,682,924
[45] Date of Patent: Jul. 28, 1987

[54] SELF-LOCKING NUT DEVICE AND METHOD

[76] Inventors: Jack R. Kerr, 1912 Peycoa Dr. North; Gerald L. Dunsmore; Thomas V. Shelton, both of 1916 Peyco Dr. North, all of, Arlington, Tex. 76017

[21] Appl. No.: 741,152

[22] Filed: Jun. 4, 1985

[51] Int. Cl.⁴ ............................................. F16B 39/32
[52] U.S. Cl. ................................... 411/329; 411/328; 10/86 A
[58] Field of Search ............................... 411/204–208, 411/327–329, 317, 318, 198, 951; 10/86 A

[56] References Cited

U.S. PATENT DOCUMENTS

| | | | |
|---|---|---|---|
| 508,823 | 11/1893 | Harmon et al. | 411/329 |
| 842,647 | 1/1907 | Gmeiner | 411/204 |
| 918,527 | 4/1909 | Galey | 411/329 |

FOREIGN PATENT DOCUMENTS 423595  2/1935  United Kingdom ................ 411/329

*Primary Examiner*—Gary L. Smith
*Assistant Examiner*—Neill Wilson
*Attorney, Agent, or Firm*—Peter J. Murphy

[57] ABSTRACT

A self-locking nut has an annular body, an axial threaded bore, and a hexagonal exterior periphery. A small bore is drilled through the body parallel to the threaded bore adjacent to an apex of two peripheral flat surfaces. An L-shaped locking pin has a base leg received in that small bore, and an interference leg projecting into the threaded bore for interfering relation with a mating bolt. The distal end of the base leg is provided with an outwardly facing recess, and this end is secured relative to the nut body by cold flowing body material into engagement with the pin recess. The pin is fabricated from Type 308 stainless steel welding rod having a uniform circular cross section.

11 Claims, 4 Drawing Figures

SELF-LOCKING NUT DEVICE AND METHOD

BACKGROUND AND SUMMARY OF THE INVENTION

This invention relates to a self-locking nut of the anti-reversing type, to a method for fabricating such a self-locking nut, and to such method including the new use of a material suitable for the anti-reversing pin component of the self-locking nut.

This invention is further concerned with self-locking nuts of a type which are suitable for use in the fabrication of structures such as microwave towers and highway structures. In the fabrication of such structures it is desirable to use nuts and bolts which have a very effective protective coating to minimize deterioration due to rust, corrosion, etc.

A very effective protective coating for steel nuts and bolts is referred to as "hot dip galvanized"; and one characteristic of this protective coating is that the thickness of the coating is not uniform. With that characteristic, many known types of lock nuts may not be used effectively, since where the hot dip coating is particularly thick, the binding may be so severe that the self-locking nut may not be turned.

A form of self-lacking nut which has been found effective for use with bolts treated by the hot dip galvanized process, is a nut having an anti-reversing pin which projects generally radially inward from the nut for interference engagement with the threads of the bolt. In the manufacture of such anti-reversing nut, the interference pin projects radially into the thread bore; and in use that pin will be deflected in one direction or the other, about 30° from the radial position for example, to assume an anti-reversing position relative to the direction in which the nut is being turned on the bolt. The tip of this pin is configured to be received partially within the groove of the bolt thread and to bite into the bolt material when urged in a reverse direction. The pin, which is anchored in the nut, is necessarily elastic to maintain the interference engagement with the bolt thread and maintain the anti-reversing force, which enables it to perform its function as a self-locking nut.

When it is desired to remove the nut from the bolt, a high torque must be applied which effects the swinging of the anti-reversing pin and accompanying deflection in the opposite direction from the radial position, whereby the nut then becomes anti-reversing in the opposite direction.

To provide an effective self-locking nut for a hot dip galvanized bolt, it is desirable that the nut be relatively free spinning, either while threading the nut onto the bolt or while unthreading the nut from the bolt, after overcoming the high anti-reversing torque, for several reasons. One reason is to minimize any galling or other defacing of the protective coating on the threads which may result in exposure of the base metal and thereby subject the bolt to rust or other corrosion. Another reason is to facilitate the construction of structures being asembled with nuts and bolts and to promote the safety of the workers who may be laboring at either high or otherwise hazardous locations. When working at high locations, such as on microwave towers, the use of power tools is sometimes impractical; and a requirement for applying high torque to these fasteners may be hazardous to the workers who must at all times be concerned with body balance and stability.

While self-locking nuts having inwardly directed interference pins as above described are known in the art, a problem with some of these nuts is that the pins break off after being deflected because of lack of sufficient elasticity. Those nuts of course must be discarded; and the reliability of the nuts comes into question. That is, do the anti-reversing pins have sufficient elasticity to perform the intended anti-reversing or locking function.

An object of this invention is to provide an improved self-locking nut of the anti-reversing type, and a method for manufacturing same.

Another object of this invention is to provide an improved self-locking nut of the anti-reversing type which is relatively free spinning while running the nut onto or off from a bolt, and a method for manufacturing same.

A further object of this invention is to provide a self-locking nut of the anti-reversing type which is adapted to be used repeatedly, and a method for manufacturing same.

Still another object of this invention is to provide an improved self-locking nut of the anti-reversing type having an anti-reversing pin which projects into interference engagement with the bolt and which is adapted to be oscillated between alternative anti-reversing positions, and a method for manufacturing same.

A still fruther object of this invention is to provide a self-locking nut of the anti-reversing type as set forth in the preceding object, wherein the anti-rotation pin is fabricated from quarter hard stainless steel welding rod.

Another object of this invention is to provide an improved self-locking nut of the anti-reversing type having an anti-reversing pin which projects into interference engagement with the bolt, and which has the required elasticity for repeated oscillations between alternative anti-reversing positions, and a method for manufacturing same.

The novel features and the advantages of the invention, as well as additional objects thereof, will be understood more fully from the following description when read in connection with the accompanying drawings.

DRAWINGS

DESCRIPTION OF THE PREFERRED EMBODIMENT

The drawings illustrate a conventional hex nut which may be fabricated from steel for example, which nut of course includes an annular body 10 having a threaded axial bore 11, and having a hex-shaped periphery for engagement by suitable wrenching tools.

The type of self-locking nut which is the subject of this invention, is particularly suitable for use with nut and bolt assemblies having a protective coating or plating, and is particularly desirable for use with nuts and bolts which are protected by a process known as "hot dip galvanized". While this hot dip galvanized process produces a coating which is not as uniform as electroplating for example, the coating is considered superior to some forms of electroplating from the standpoint of protection against rust and other corrosion. The type of self-locking nut which is the subject of this invention is particularly suited for use with bolts which have been coated by the hot dip galvanized process, since this type of self-locking nut is less damaging to both the nut and the bolt in connection with the fabrication of the self-locking nut and in connection with the use of the self-locking nut.

Self-locking nuts according to the invention may be fabricated from nuts ranging in thread size from one-half inch to one and one-half inches for example. By way of example, particular reference will be made in this specification to a nut having a one inch thread and having a thread pitch of one-eighth inch.

To fabricate the self-locking nut according to the invention, an L-shaped anti-reversing or locking pin 20 is assembled with the nut body 10 in the desired relationship. A small bore 13 is drilled through the nut body parallel to the thread axis, to receive one leg of the anti-reversing pin as will be described.

The anti-reversing pin 20 is preferably fabricated from a stainless steel wire or rod having a circular cross section; and for the one inch nut mentioned above, the anti-reversing pin would have a diameter of about one-eighth inch.

Figure 2:
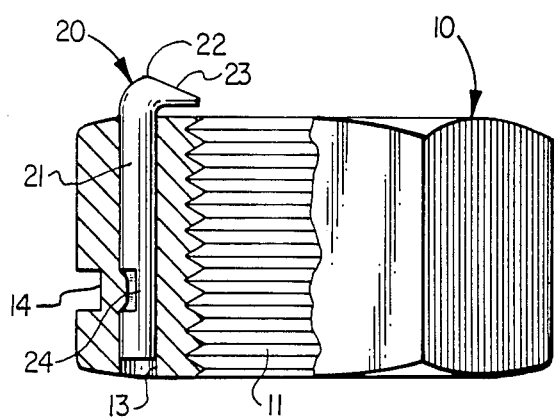
FIG. 2 is a side view, partially in section, of the nut of FIG. 1 illustrating the mounting of the anti-reversing pin.

As best seen in FIG. 2, the anti-reversing pin 20 is fabricated to an L-shaped having a longer base leg 21 and a shorter interference leg 22. The base leg is received in the small bore 13, and has a length approximately the same as the thickness of the nut body 10 so that when it is received within the bore 13 it will not project from the opposite end of the bore. The interference leg 22 is of a length to extend into the threaded bore 11, to have the desired interference relation with the threads of a mating bolt as will be described. The tip of the interference leg is provided with a bevel or ground off portion 23 at its exterior face, to reduce the thickness of this tip and allow for some penetration into a thread groove of a mating bolt.

The base leg of the pin is provided with a recess 24, preferably in the form of a flatted portion, which is located near the distal end of the base leg and which faces in a direction opposite from the direction of the interference leg 22. This recess then is spaced a substantial distance from the interference leg.

Figure 1:
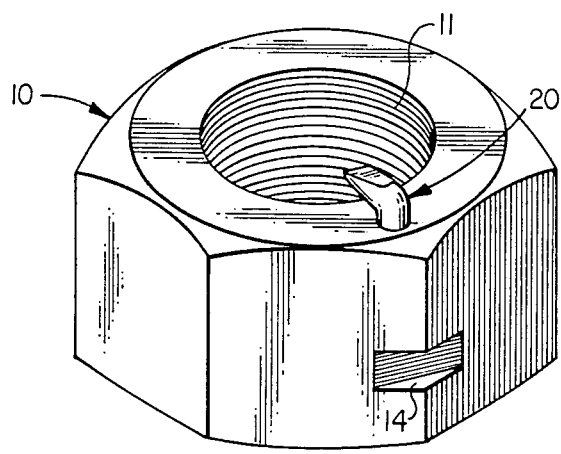
FIG. 1 is a perspective view of a self-locking nut according to the invention.

For the securing of the anti-reversing pin 20 to the nut body 10, the pin is oriented as illustrated in FIG. 1 with the interference leg aligned radially with the thread axis and projection into the thread bore, with the recess 24 then facing outwardly relative to the thread axis. To secure the pin to the nut body, the nut is struck with a swage for example on its exterior surface in radial alignment with the recess 24, as indicated by the indention 14, to effect the cold flow of metal of the nut body into the bore 13 and into engagement with the pin recess 24. In this manner, the distal end of the pin base leg 21 is secured against any movement relative to the nut body, either axial or rotational. However, because of the axial distance between the recess 24 and the interference leg 22 some tortional twisting of the leg 21 may occur when the interference leg 22 is deflected.

The applicant has discovered that a particular material is very advantageous for the fabrication of the above described anti-reversing pin, that material being known as Type 308 quarter hard Stainless Steel Welding Rod. A typical chemical analysis of that Type 308 stainless steel welding rod includes the following: C-0.06%; Si-0.04%; Mn-1.8%; P-0.02%; S-0.01%; Cu-less than 0.5%; Ni-10.0%; Cr-20.7%; Mo-less than 0.5%. The applicant has discovered that this particular stainless steel product has the desired qualities of elasticity to function in the desired manner, and to continue to function in the desired manner after repeated deflections or oscillations which will now be described.

Figure 3:
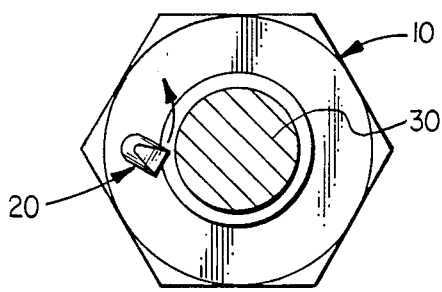
FIG. 3 is an end view of the self-locking nut of FIG. 1 being run onto a bolt in a clockwise direction.

FIG. 3 is a view of a nut bolt assembly, with the bolt 30 being shown in cross section in the plane of the interference leg of the anti-reversing pin. In the fabrication of the nut, the tip of the interference leg will preferably be positioned relative to the nut threads, to be received within the groove of the thread of a mating bolt, and this tip will be spaced slightly from the end face of the nut. The nut is threaded onto the bolt from the face opposite from that carrying the interference leg, so that the nut threads will be substantially fully engaged with the bolt threads when the anti-reversing pin first comes in contact with the bolt threads and also, of course, to enable the seating of the nut. Because of the precalculated interference relationship, the interference tip will necessarily be deflected by the bolt away from the radial position illustrated in FIG. 1 to a position approximately 30° from that radial position. Usually, that deflection of the interference tip will be within the range of 25° to 40° from the radial position. FIG. 3 illustrates the condition of a nut bolt assembly having right hand threads, with the nut being turned in a clockwise direction relative to the bolt to thread the nut onto the bolt. Because of the deflection of the interference leg in the manner illustrated, the nut will be relatively free spinning on the bolt and may be run onto the bolt fairly easily with the use of nothing more substantial than a light weight hand wrench. By way of example, for a one inch nut bolt assembly, about twenty inch-pounds may be required to run the nut onto the bolt. It will be seen that one corner of the tip of the interference leg is engaged in the groove of the bolt thread; and should an attempt be made to reverse the nut on the bolt, this corner will bite into the bolt material or the coating applied to the bolt, and prevent reverse rotation unless a significant amount of torque is applied. Because of the tortional elasticity of the base leg as above described, the tip of the interference leg will be maintained in intimate contact with the thread groove of the bolt.

Figure 4:
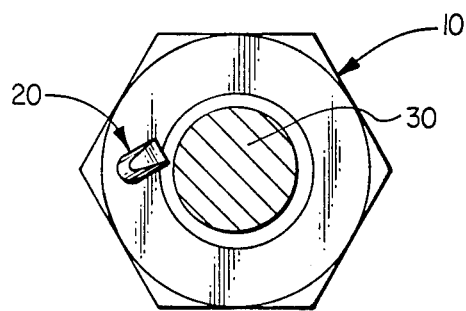
FIG. 4 is a view similar to FIG. 3 of a self-locking nut being run on a bolt in a counterclockwise direction.

Should it be desired to back a nut off the bolt, that is rotate the nut in a counterclockwise direction, it will be necessary to apply a substantial amount of torque to the nut to cause the interference leg 21 to swing or oscillate from the position of FIG. 3 to the position of FIG. 4. The relative dimensions of the nut and bolt, the interference leg, and the bore 13 are such to permit this swinging. By way of example, four hundred inch-pounds of torque may be required to effect the swinging of the interference arm to the reverse position. Once this arm has been swung and is now deflected in the opposite direction, as illustrated in FIG. 4, the torque required to further unthread the nut from the bolt will be again reduced to about twenty inch pounds for example, with the nut being relatively free spinning on the bolt. When the nut is free of the bolt, the deflection leg will return to substantially the initial radial position, so that the nut may be replaced on the bolt or otherwise reused as a self-locking nut.

With the nut being relatively free spinning when being run onto or off from the bolt, there is minimal galling or damage to the surfaces of the bolt threads which might tend to interfere with the protective coating and allow rust or other corrosion of the bolt threads to occur, yet the nut is very effective as a self-locking nut. This self-locking nut then is particularly effective for use with bolts having a protective coating or plating, and particularly for a bolt coated by the hot dip galvanized process where the thickness of the coating may not be uniform. Because of the elasticity of the anti-reversing pin, the pin will accommodate irregularities of the bolt thread surface.

What has been described are a unique self-locking nut and a unique method for fabricating a self-locking nut of the type having an anti-reversing pin. A particular feature and advantage of the invention is that the self-locking nut is suitable for use with all types of bolts; and is particularly suitable for use with bolts having a protective coating applied by the hot dip glavanized method.

An important feature of the invention is that the anti-reversing pin maintains desired interference pressure in the thread groove of the bolt to assure the anti-rotation or self-locking feature, and yet the nut is relatively free spinning on the bolt during the running of the nut onto the bolt or the running of the nut off from the bolt to minimize such effort which might be particularly hazardous at above ground work locations.

While preferred embodiment of the invention has been illustrated and described, it will be understood by those skilled in the art that changes and modifications may be restored to without departing from the spirit and scope of the invention.

What is claimed is:

1. A method for fabricating a self-locking nut, including the steps forming, in an annular nut body having a threaded bore, a small bore at one side thereof parallel to the thread axis of said threaded bore and opening to at least one face of said nut body;

forming an L-shaped anti-reversing pin from an elongated shaft of quarter hard stainless steel welding rod;

forming a locking recess on one leg of said pin, spaced longitudinally from said other leg facing away from the direction of said other leg;

mounting said anti-reversing pin on said nut body with said one leg of said pin confined in said small bore, and with said other leg of said pin extending toward said threaded bore for interference engagement with a mating bolt:

flowing metal of said nut body into said small bore and into engagement with said locking recess, to secure that portion of said pin to said nut body;

said other leg and the adjacent portion of said one leg thereby being oscillatable relative to said nut body between alternative anti-reversing positions relative to a mating bolt.

2. A method as set forth in claim 1, including the step forming said anti-reversing pin from an elongated shaft having a uniform circular cross-section.

3. A method as set forth in claim 1, including the step positioning the free-end of said other leg to be received in the thread groove of a mating bolt when said nut is threaded onto said bolt.

4. A method as set forth in claim 1, including the step forming said anti-reversing pin from Type 308 stainless steel welding rod.

5. A method as set forth in claim 4, including the step forming said anti-reversing pin from Type 308 Stainless Steel Welding Rod having the following analysis: C-0.06%; Si-0.04%; Mn-1.8%; P-0.02%; S-0.01%; Ni-10.0%; Cr-20.7%.

6. A method as set forth in claim 4, including the step forming said anti-reversing pin from Type 308 Stainless Steel Welding Rod having the following analysis: C-0.06%; Si-0.04%; Mn-1.8%; P-0.02%; S-0.01%; Cu-less than 0.5%; Ni-10.0%; Cr-20.7%; Mo-less than 0.5%.

7. In a self-locking nut which includes: an annular body having internal threads; said body having a small bore at one side parallel to the thread axis thereof; an L-shaped anti-reversing pin having one leg disposed within said small bore and having its other leg extending from said bore toward said thread axis; said one leg having a locking recess spaced from said other leg and facing away therefrom; said locking recess being engaged by metal of said nut body flowed into said small bore to secure said pin within said bore, whereby said other leg and the adjacent portion of said one leg are oscillatable relative to said nut body between alternative anti-reversing positions; the improvement comprising said anti-reversing pin being fabricated from quarter hard stainless steel welding rod 8. A self-locking nut as set forth in claim 7 including said anti-reversing pin being formed from an elongated shaft having a uniform circular cross-section.

9. A self-locking nut as set forth in claim 7 including said anti-reversing pin being formed from Type 308 stainless steel welding rod.

10. A self-locking nut as set forth in claim 7 including said anti-reversing pin being formed from Type 308 stainless steel welding rod having the following analysis: C-0.06%; Si-0.04%; Mn-1.8%; P-0.02%; S-0.01%; Ni-10.0%; Cr-20.7%.

11. A self-locking nut as set forth in claim 7 including said anti-reversing pin being formed from Type 308 stainless steel welding rod having the following analysis: C-0.06%; Si-0.04%; Mn-1.8%; P-0.02% S-0.01%; Cu-less than 0.5%; Ni-10.0%; Cr-20.7% Mo-less than 0.5%.

* * * * *

UNITED STATES PATENT AND TRADEMARK OFFICE
CERTIFICATE OF CORRECTION

PATENT NO.  : 4,682,924

DATED       : July 28, 1987

INVENTOR(S) : Jack R. Kerr, Gerald L. Dunsmore, Thomas V. Shelton

It is certified that error appears in the above-identified patent and that said Letters Patent is hereby corrected as shown below:

| | |
|---|---|
| Column 1, Line 27 | "self-lacking" should be --self-locking-- |
| Column 2, Line 27 | "fruther" should be --further-- |
| Column 2, Line 29 | "anti-rotation" should be --anti-reversing-- |
| Column 3, Line 50 | "projection" should be --projecting-- |
| Column 5, Line 42 | insert "and" after leg |

Signed and Sealed this

Twenty-third Day of August, 1988

*Attest:*

DONALD J. QUIGG

*Attesting Officer*   *Commissioner of Patents and Trademarks*